(12) United States Patent
Chen et al.

(10) Patent No.: US 8,979,090 B2
(45) Date of Patent: Mar. 17, 2015

(54) VALUABLE FILE IDENTIFICATION DEVICE

(71) Applicant: GRG Banking Equipment Co., Ltd., Guangzhou, Guangdong (CN)

(72) Inventors: Guang Chen, Guangzhou (CN); Tiancai Liang, Guangzhou (CN); Kun Wang, Guangzhou (CN); Dingxi Chen, Guangzhou (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 0 days.

(21) Appl. No.: 14/233,694

(22) PCT Filed: Oct. 26, 2012

(86) PCT No.: PCT/CN2012/083555
§ 371 (c)(1),
(2) Date: Jan. 17, 2014

(87) PCT Pub. No.: WO2013/131375
PCT Pub. Date: Sep. 12, 2013

(65) Prior Publication Data
US 2014/0210161 A1    Jul. 31, 2014

(30) Foreign Application Priority Data
Mar. 9, 2012  (CN) .......................... 2012 1 0062147

(51) Int. Cl.
*B65H 5/02*    (2006.01)
*H04N 1/06*    (2006.01)
(Continued)

(52) U.S. Cl.
CPC .. *G07D 7/00* (2013.01); *G07D 7/04* (2013.01); *G07D 7/12* (2013.01)
USPC ............................ 271/275; 358/490; 358/491

(58) Field of Classification Search
CPC ............. B65H 2404/268; B65H 5/025; H04N 1/0607; H04N 1/0657; H04N 5/025
USPC .................................... 271/275; 358/490, 491
See application file for complete search history.

(56) References Cited

U.S. PATENT DOCUMENTS 3,737,575 A * 6/1973 Kominami ..................... 358/491
4,004,798 A * 1/1977 Akisato ......................... 271/286
(Continued)

FOREIGN PATENT DOCUMENTS

CN       1427793 A      7/2003
CN       1670513 A      9/2005
(Continued)

OTHER PUBLICATIONS

International Search Report Feb. 7, 2013 from corresponding International Application No. PCT/CN2012/083555.

*Primary Examiner* — Patrick Cicchino
(74) *Attorney, Agent, or Firm* — Wolf, Greenfield & Sacks, P.C.

(57) ABSTRACT

A valuable file identification device, comprising a housing; a hollow transparent drum; an annular clamping belt supported by at least two tension rollers and pressing against the transparent drum, the outer surface of the annular clamping belt and the outer surface of the transparent drum forming a clamping and conveying channel for the valuable file, and the length of the clamping and conveying channel being greater than that of the valuable file in the conveying direction; at least one information acquisition device, the information acquisition element of the information acquisition device being adjacent to the inner surface of the transparent drum, facing at least a part of the outer surface of the annular clamping belt, and being fixed relative to the side wall of the housing; and a power-driven device respectively driving the transparent drum and the annular clamping belt to move synchronously in opposite directions.

15 Claims, 5 Drawing Sheets

(51) Int. Cl.
*G07D 7/00* (2006.01)
*G07D 7/04* (2006.01)
*G07D 7/12* (2006.01)

(56) References Cited

U.S. PATENT DOCUMENTS

| | | | |
|---|---|---|---|
| 4,712,896 A | | 12/1987 | Holthusen |
| 5,057,942 A | * | 10/1991 | Kanehl et al. ............ 358/490 |
| 5,098,077 A | | 3/1992 | Russel |
| 5,504,619 A | * | 4/1996 | Okazaki ............... 359/489.07 |
| 2001/0010415 A1 | * | 8/2001 | Enders et al. .............. 271/272 |
| 2004/0026851 A1 | * | 2/2004 | Schaede et al. ............ 271/277 |

FOREIGN PATENT DOCUMENTS

| | | |
|---|---|---|
| CN | 1818978 A | 8/2006 |
| CN | 1947159 A | 4/2007 |
| CN | 101095171 A | 12/2007 |
| CN | 102610029 A | 7/2012 |
| GB | 597581 | 1/1948 |

* cited by examiner

VALUABLE FILE IDENTIFICATION DEVICE

The present application is the U.S. National Stage of International Application No. PCT/CN2012/083555, filed on Oct. 26, 2012, which claims the benefit of priority to Chinese Patent Application No. 201210062147.4 titled "VALUABLE DOCUMENT IDENTIFICATION DEVICE", filed with the Chinese State Intellectual Property Office on Mar. 9, 2012, which are incorporated by reference to the maximum extent allowable by law.

FIELD OF THE INVENTION

The present application relates to information collecting technology of a sheet-like medium, and particularly to a solution which can effectively solve the problems that there is interference between various information collecting elements and the medium is tilted or deformed in the collecting and conveying process.

BACKGROUND OF THE INVENTION

An identification device for identifying characteristics of financial notes to be processed is required to be mounted on an equipment for processing the financial notes. For example, financial equipments, for example the cash automatic teller machine (ATM), the banknote sorter and the cash counter, are all provided with the banknote identification device for identifying information of the banknote, for example the sorts, the face value, the facing orientation and the authenticity. Specific identifiable anti-fake labels are added on the banknote during the design and print process, such that various sensors are arranged in the above banknote identification device to detect and obtain relevant information of the anti-fake labels, for example an optical image sensor is provided to obtain a surface image or a projection image of the banknote by irradiating the banknote with lights of different wave lengths, and a magnetic sensor is provided to detect a magnetic printing ink and a metal safety wire which are added on the banknote during the print process. In order to precisely identify the banknote, generally multiple optical image sensors and magnetic sensors are provided in one identifying and detecting device.

Figure 1:
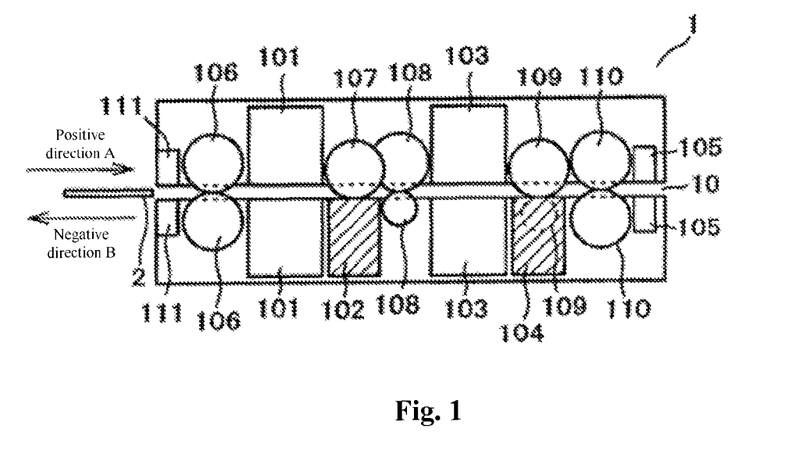
FIG. 1 is a structural schematic view of a conventional valuable document identification device.

A banknote identification device is disclosed in Chinese Patent No. CN 1818978A, in which multiple magnetic sensors and multiple optical image sensors are alternatively provided. Referring to FIG. 1, multiple rollers 106 to 111 are provided on a conveying passage 10 of the banknote identification device 1, and two optical sensors 101, 103 and two magnetic sensors 102, 104 are alternatively provided at two sides of the conveying passage 10. When the banknote enters the banknote identification device 1 in a direction A, the optical sensor 101 is used to eliminate a deviation of the above sensors provided downstream the optical sensor 101. The optical sensor 103 is used to detect characteristics of the banknote under specific wave lengths. The magnetic sensor 102 is used to detect a magneto-impedance characteristic of the banknote, and the magnetic sensor 104 is used to detect a magnetic resistance characteristic of the banknote. Various information of the magnetic resistance is identified when the banknote passes through the above sensors in the conveying passage 10.

Various sensors are used in the banknote identification device, which may cause mutual interference between adjacent sensors, thus may cause interference for information collection and the system being unstable.

Further, during the note conveying process, the note needs to be conveyed at a high speed in the financial equipment. When the note passes through the above identification device, in which the note is clamped and conveyed by the linear conveying passage cooperating with conveying rollers, at a high speed, it is hard to avoid the note being tilted. Since the note is tilted in the identification device, the information acquired by various identification sensors has a worse regularity, which may cause a huge workload for processing the identification information.

SUMMARY OF THE INVENTION

One object of the present application is to provide a valuable document identification device which can effectively solve the problems that there is interference between various information collecting elements and the medium is tilted or deformed during the collecting and conveying process.

The valuable document identification device includes:

a hollow transparent rotating cylinder assembled with mounting side walls via a hollow bearing;

an annular clamping belt supported by at least two tension rollers and abutted against an outer surface of the transparent rotating cylinder, wherein a clamping and conveying passage of the valuable document is formed between an outer surface of the annular clamping belt and the outer surface of the transparent rotating cylinder, and has a length greater than a length of the valuable document in a conveying direction, and two ends, formed by the two tension rollers, of the annular belt functions as an inlet and an outlet of the clamping and conveying passage for the valuable document respectively;

at least one information collecting device, an information collecting element of which is close to an inner surface of the transparent rotating cylinder and faces at least a portion of the outer surface of the annular clamping belt, and the information collecting element is unmovable relative to the mounting side walls; and a power driving device, which drives the transparent rotating cylinder and the annular clamping belt to move synchronously in opposite directions.

Preferably, the annular clamping belt is a nontransparent belt.

Preferably, a driven wheel is provided at the inlet of the clamping and conveying passage at a position corresponding to the tension roller.

Preferably, an inlet end and an outlet end of the clamping and conveying passage are both provided with a guiding sheet for guiding the valuable document to smoothly enter and leave the clamping and conveying passage.

Preferably, a driven wheel is provided at the outlet of the clamping and conveying passage.

Preferably, the valuable document identification device further includes a depth collecting device mounted on a conveying path through which the valuable document enters or leaves the clamping and conveying passage.

Preferably, the valuable document identification device further includes a magnetic signal collecting device mounted on a conveying path through which the valuable document enters or leaves the clamping and conveying passage.

Preferably, a mounting position relationship between the information collecting element of the information collecting device and the transparent rotating cylinder is required to meet the following condition:

$$FOV = \frac{180 \times WN}{\pi \times Ha}$$

Wherein, "FOV" is a field angle of the information collecting element, "WN" is a width of the valuable document collected within the field angle, "Ha" is a distance between the valuable document and an apex of the field angle, and "WN" is equal to the minimum note-like medium width "WNmin" collected by the collecting device and calculated according to the requirement of image collection resolution.

Preferably, in order to accomplish the information collection of two sides of the valuable document by only conveying the valuable document once, the valuable document identification device includes two sets of the hollow transparent rotating cylinder, the annular clamping belt, the information collecting device and the power driving device, which are symmetrically arranged, wherein the valuable document enters an inlet of another clamping and conveying passage from an outlet of one clamping and conveying passage.

Preferably, the valuable document identification device further includes a casing for receiving all components, wherein the mounting side walls are a part of the casing, and the casing is provided with openings, at positions corresponding to the inlet and the outlet of the clamping and conveying passage respectively, for the valuable document to enter and leave.

Compared with the prior art, the valuable document identification device has the following advantages.

1. When clamping and conveying the valuable document, the valuable document conveying passage, formed by the transparent rotating cylinder and the annular clamping belt, provides a continuous static friction force for the valuable document, such that the conveying manner in which the conveying passage and the valuable document are relatively static may solve the problem that the valuable document is tilted or deformed in collecting process, thereby improving the identification effect of the note-like medium.
2. The valuable document conveying passage, formed by the transparent rotating cylinder and the annular clamping belt, is of an arc shape, such that when multiple information collecting elements arranged therein are working simultaneously, the mutual interference therebetween is avoided. For example, optical sensors for collecting the image information of the valuable document can not work simultaneously when being arranged very close to each other.

BRIEF DESCRIPTION OF THE DRAWINGS

The accompanying drawings are provided to help further understanding of the present application and constitute a part of this specification. The drawings are provided to describe the present application in conjunction with embodiments of the present application, and do not intent to limit the present application.

DETAILED DESCRIPTION OF THE INVENTION

In order to further describe the present application, one preferred embodiment of the present application is illustrated below in conjunction with drawings.

Figure 2:
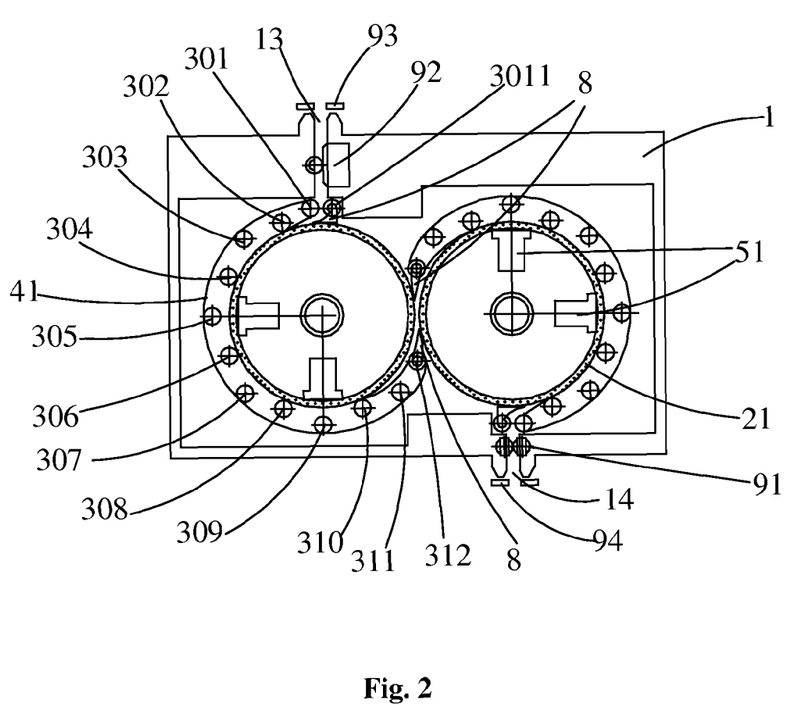
FIG. 2 is a schematic view of a valuable document identification device provided by the present application.
Figure 3:
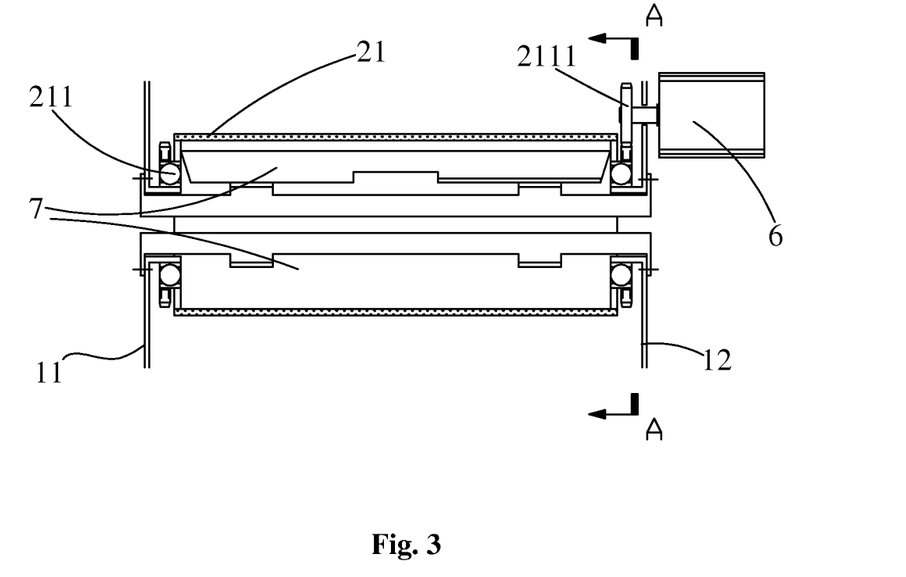
FIG. 3 is a schematic view showing a connection relationship between an information collecting device and a casing in FIG. 2.
Figure 4:
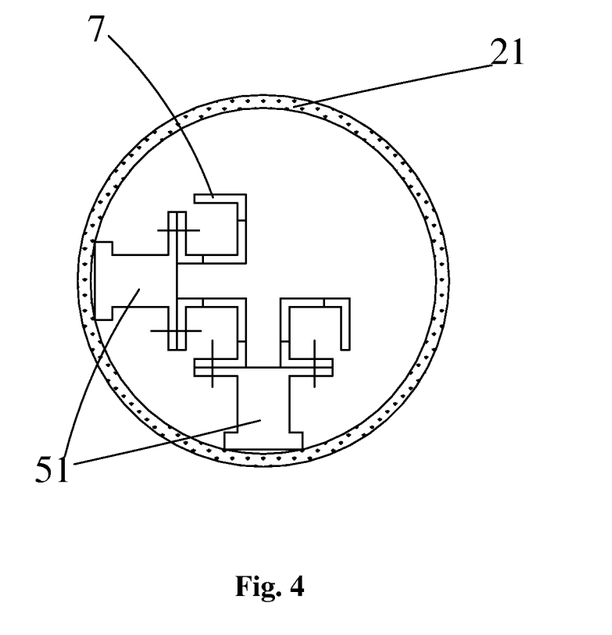
FIG. 4 is a schematic view showing a position relationship between transparent rotating cylinders and the information collecting device in FIG. 2.
Figure 5:
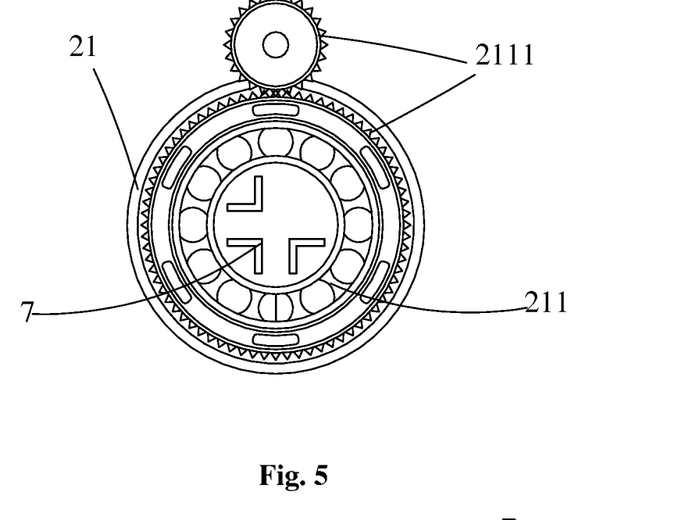
FIG. 5 is a schematic view of a driving component in FIG. 4 viewed in A-A direction.

Referring to FIG. 2, the present application provides a valuable document identification device, which may realize the collection of information on two sides of a valuable document by conveying the valuable document once. The valuable document identification device includes a casing 1; two hollow transparent rotating cylinders 21, which are arranged symmetrically in the casing 1 and assembled with two side walls of the casing 1 correspondingly via hollow bearings (not shown in FIG. 2, reference may be made to FIG. 5); and two nontransparent annular clamping belts 41, each of which is supported by 12 tension rollers 301 to 312 and abut against an outer surface of one corresponding transparent rotating cylinder 21, wherein a clamping and conveying passage of the valuable document is formed between an outer surface of each of the annular clamping belts 41 and the outer surface of the corresponding transparent rotating cylinder 21, and the clamping and conveying passage has a length greater than a length of the valuable document in a conveying direction. Two ends, formed by the tension rollers 301 and 312 respectively, of each of the annular belts 41 functions as an inlet and an outlet of the clamping and conveying passage for the valuable document, an opening 13 is provided in the casing 1 at a position corresponding to the inlet of the clamping and conveying passage, and symmetrically, an opening 14 is provided in another side of the casing. Each of the transparent rotating cylinders is provided with two information collecting devices 51. Referring to FIGS. 3 to 5, the connection relationship between the information collecting devices 51, the transparent rotating cylinders 21 and the casing 1 is further illustrated. Each of the two transparent rotating cylinders 21 is rotatably connected to side walls 11, 12 via a to hollow bearing 211 and obtains power from a driving motor 6 via a gear 2111, and information collecting elements of the information collecting devices 51 are fixedly connected to a connecting member 7. The connecting member 7 passes through the hollow bearing 211 of a glass rotating cylinders 21 without contacting with the hollow bearing 211 and is fixedly connected to side walls 11, 12, wherein a collecting end of each of the information collecting elements faces a portion of the outer surface of the annular clamping belt.

Further, the annular clamping belt 41 is driven by the driving motor via the tension wheel 301 or 302 to move synchronously with the transparent rotating cylinder in a direction opposite to the rotation direction of the transparent rotating cylinder.

Figure 6:
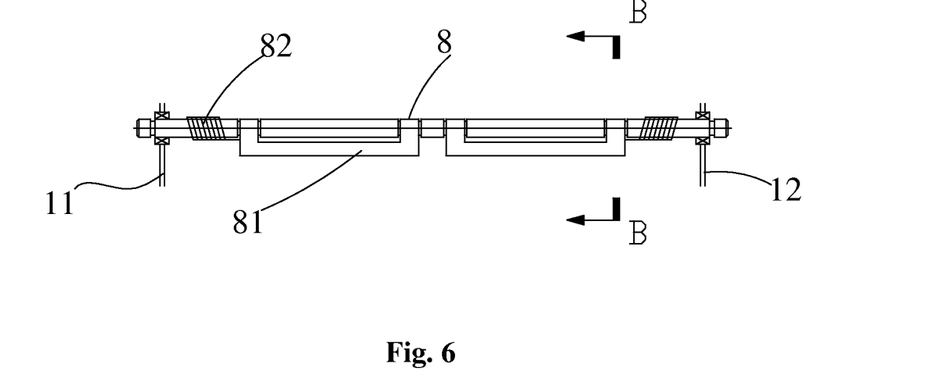
FIG. 6 is a schematic view showing a connection position of a guiding member in FIG. 2.
Figure 7:
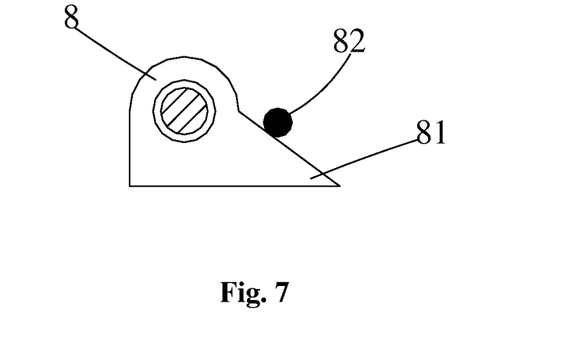
FIG. 7 is a schematic view of the guiding member shown in FIG. 6 viewed in B-B direction.

In order that the valuable document may smoothly enter into the clamping and conveying passage, a driven wheel 3011 is provided at an inlet end of the clamping and conveying passage at a position corresponding to the tension roller 301, and the inlet and the outlet of the clamping and conveying passage are both provided with a guiding sheet 8. Referring to FIGS. 6 and 7, the guiding sheet 8 is provided coaxially with the driven wheel 3011, and a guiding end 81 of the guiding sheet 8 is in contact with the outer surface of the transparent rotating cylinder 21 via a torsion spring 82, thereby realizing a guiding effect during the entering and leaving of the valuable document.

In order to obtain a depth information and a magnetism information of the valuable document simultaneously, a depth collecting device 91 and a magnetic signal collecting device 92 are provided on conveying paths through which the valuable document enters and leaves the clamping and conveying passage in this embodiment. Further, in order to effectively control the operation of the collecting device of the valuable document identification device, trigger sensors 93, 94 are provided respectively at the inlet and the outlet of the valuable document. When the trigger sensor 93 detects the entering of the valuable document, the valuable document identification device is started; and when the trigger sensor 94 detects the leaving of the valuable document, the valuable document identification device is stopped.

Figure 8:
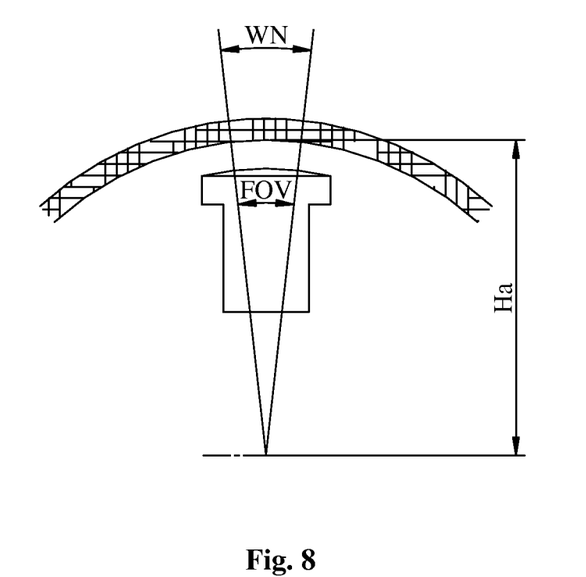
FIG. 8 is a schematic view showing a collection range of the valuable document of the information collecting device in the valuable document identification device as in FIG. 2.
Figure 9:
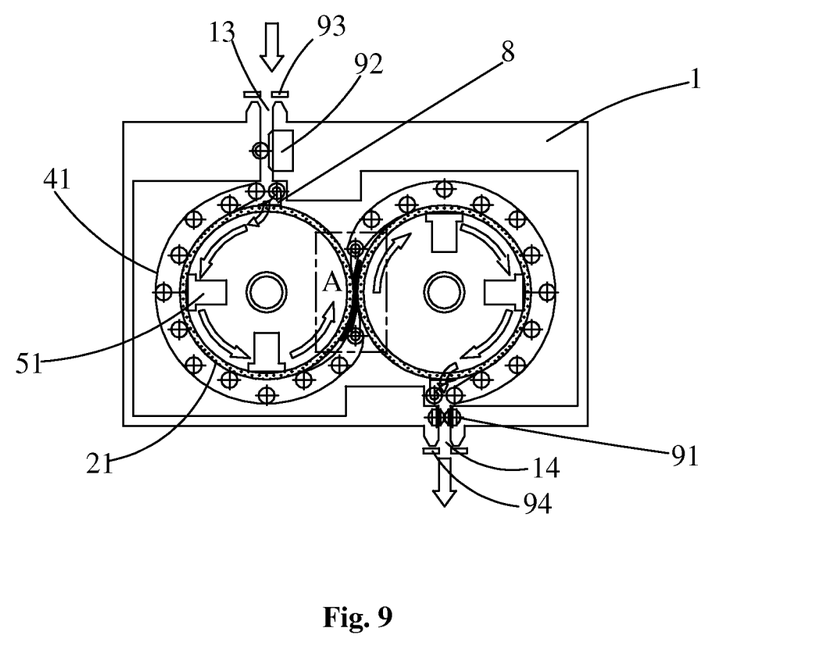
FIG. 9 is a schematic view of the movement of the valuable document in the to valuable document identification device as shown in FIG. 2.
Figure 10:
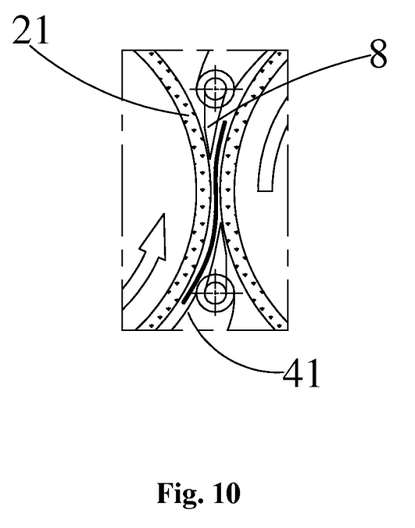
FIG. 10 is partial enlarged view of a portion "A" in FIG. 9.

Further, referring to FIG. 8, in order to ensure the collection of valid data of the valuable document by the information collecting device 51, an installation position relationship between the information collecting element of the information collecting device and the transparent rotating cylinder 21 is required to meet the following condition:

$$FOV = \frac{180 \times WN}{\pi \times Ha}$$

Wherein, "FOV" is a field angle of the information collecting element, "WN" is a width of the valuable document collected within the field angle, "Ha" is a distance between the valuable document and an apex of the field angle, and "WN" is equal to the minimum note-like medium width "WNmin" collected by the collecting device and calculated according to the requirement of image collection resolution.

In order to further illustrate working principle of the valuable document identification device, an identification process of the valuable document by the device is illustrated in conjunction with FIGS. 2 to 10. For simplifying the illustration, herein the valuable document is set to enter into the valuable document identification device via the opening 13 and leave the valuable document identification device via the opening 14. And in practical use, the valuable document identification device has a bidirectional use function.

When the valuable document is conveyed to the opening 13, the trigger sensor 93 detects the valuable document, then the valuable document identification device is started. The transparent rotating cylinder 21 and the annular clamping belt 41 are respectively driven by respective driving motors to move, and linear velocities of the movements of the outer surface of the annular clamping belt 41 and that of the outer surface of the transparent rotating cylinder 21 are consistent. After passing through the magnetic signal device 92 mounted at the opening 12, the valuable document is guided by guiding sheet 8 to enter into a movement clamping passage formed between the outer surface of the annular clamping belt 41 and the outer surface of the transparent rotating cylinder 21 and is clamped to move forward along with the movements of the outer surface of the annular clamping belt 41 and the outer surface of the transparent rotating cylinder 21. When the valuable document is moving forward, the image of the valuable document is collected line by line by the information collecting device 51 which collects the image of the valuable document.

In this solution, two sets of the transparent rotating cylinder 21, the annular clamping belt 41 and information collecting devices 51 symmetrically arranged are employed, thus after the valuable document passes through one clamping and conveying passage, two additional guiding sheets 8 has to be provided to guide the valuable document to smoothly enter another clamping and conveying passage from one clamping and conveying passage. When the valuable document is moving forward in said another clamping and conveying passage, the image of the other side of the valuable document is collected, then the valuable document is conveyed out via the outlet 14. When being conveyed out via the outlet 14, the depth information of the valuable document is obtained by the depth sensor 91 arranged at the outlet 14, and when the trigger sensor 94 detects that the valuable document has left, the valuable document identification device is stopped.

Further, it is to be noted that, the control of the working state of each collecting device may be started and stopped one by one depending on the coming of the valuable document, specifically the conveying speed of the valuable document being clamped is calculated according to the triggering of the trigger sensor 93 to calculate the time period that the valuable document passes through each collecting device, so as to control the collecting time of each collecting device.

The above descried embodiments are only the preferred embodiments of the present application. It is to be noted that, the protection scope of the present application is not limited to the above preferred embodiments, and is defined by the claims. For the person skilled in the art, many modifications and improvements may be made to the present application without departing from the spirit and scope of the present application, and these modifications and improvements are also deemed to fall into the protection scope of the present application.

The invention claimed is:

1. A valuable document identification device, comprising:
   a hollow transparent rotating cylinder assembled with mounting side walls via a hollow bearing;
   an annular clamping belt supported by at least two tension rollers and abutted against an outer surface of the transparent rotating cylinder, wherein a clamping and conveying passage of the valuable document is formed between an outer surface of the annular clamping belt and the outer surface of the transparent rotating cylinder, and has a length greater than a length of the valuable document in a conveying direction, and two ends, formed by the two tension rollers, of the annular belt functions as an inlet and an outlet of the clamping and conveying passage for the valuable document respectively;
   at least one information collecting device, an information collecting element of which is close to an inner surface of the transparent rotating cylinder and faces at least a portion of the outer surface of the annular clamping belt, and the information collecting element is unmovable relative to the mounting side walls;
   a power driving device, which drives the transparent rotating cylinder and the annular clamping belt to move synchronously in opposite directions; and a magnetic signal collecting device mounted on a conveying path through which the valuable document enters or leaves the clamping and conveying passage.

2. The valuable document identification device according to claim 1, wherein the annular clamping belt is a nontransparent belt.

3. The valuable document identification device according to claim 1, wherein a driven wheel is provided at the inlet of the clamping and conveying passage at a position corresponding to the tension roller.

4. The valuable document identification device according to claim 1, wherein an inlet end and an outlet end of the clamping and conveying passage are both provided with a guiding sheet for guiding the valuable document to smoothly enter and leave the clamping and conveying passage.

5. The valuable document identification device according to claim 1, wherein a driven wheel is provided at the outlet of the clamping and conveying passage.

6. The valuable document identification device according to claim 1, further comprising a depth collecting device mounted on the conveying path.

7. The valuable document identification device according to claim 1, wherein a mounting position relationship between the information collecting element of the information collecting device and the transparent rotating cylinder is required to meet the following condition:

$$FOV = \frac{180 \times WN}{\pi \times Ha}$$

wherein, "FOV" is a field angle of the information collecting element, "WN" is a width of the valuable document collected within the field angle, "Ha" is a distance between the valuable document and an apex of the field angle, and "WN" is equal to the minimum note-like medium width "WNmin" collected by the collecting device and calculated according to the requirement of image collection resolution.

8. The valuable document identification device according to claim 1, wherein the valuable document identification device comprises two sets of the hollow transparent rotating cylinder, the annular clamping belt, the information collecting device and the power driving device, which are symmetrically arranged, wherein the valuable document enters an inlet of another clamping and conveying passage from an outlet of one clamping and conveying passage.

9. The valuable document identification device according to claim 8, further comprising a casing for receiving all components, wherein the mounting side walls are a part of the casing, and the casing is provided with openings, at positions corresponding to the inlet and the outlet of the clamping and conveying passage respectively, for the valuable document to enter and leave.

10. The valuable document identification device according to claim 2, wherein the valuable document identification device comprises two sets of the hollow transparent rotating cylinder, the annular clamping belt, the information collecting device and the power driving device, which are symmetrically arranged, wherein the valuable document enters an inlet of another clamping and conveying passage from an outlet of one clamping and conveying passage.

11. The valuable document identification device according to claim 3, wherein the valuable document identification device comprises two sets of the hollow transparent rotating cylinder, the annular clamping belt, the information collecting device and the power driving device, which are symmetrically arranged, wherein the valuable document enters an inlet of another clamping and conveying passage from an outlet of one clamping and conveying passage.

12. The valuable document identification device according to claim 4, wherein the valuable document identification device comprises two sets of the hollow transparent rotating cylinder, the annular clamping belt, the information collecting device and the power driving device, which are symmetrically arranged, wherein the valuable document enters an inlet of another clamping and conveying passage from an outlet of one clamping and conveying passage.

13. The valuable document identification device according to claim 5, wherein the valuable document identification device comprises two sets of the hollow transparent rotating cylinder, the annular clamping belt, the information collecting device and the power driving device, which are symmetrically arranged, wherein the valuable document enters an inlet of another clamping and conveying passage from an outlet of one clamping and conveying passage.

14. The valuable document identification device according to claim 6, wherein the valuable document identification device comprises two sets of the hollow transparent rotating cylinder, the annular clamping belt, the information collecting device and the power driving device, which are symmetrically arranged, wherein the valuable document enters an inlet of another clamping and conveying passage from an outlet of one clamping and conveying passage.

15. The valuable document identification device according to claim 7, wherein the valuable document identification device comprises two sets of the hollow transparent rotating cylinder, the annular clamping belt, the information collecting device and the power driving device, which are symmetrically arranged, wherein the valuable document enters an inlet of another clamping and conveying passage from an outlet of one clamping and conveying passage.

* * * * *